(12) United States Patent
Stauffer (10) Patent No.: US 11,216,896 B2
(45) Date of Patent: Jan. 4, 2022

(54) IDENTIFICATION OF LEGAL CONCEPTS IN LEGAL DOCUMENTS

(71) Applicant: The Bureau of National Affairs, Inc., Arlington, VA (US)

(72) Inventor: Clinton Stauffer, Alexandria, VA (US)

(73) Assignee: The Bureau of National Affairs, Inc., Arlington, VA (US)

(*) Notice: Subject to any disclaimer, the term of this patent is extended or adjusted under 35 U.S.C. 154(b) by 188 days.

(21) Appl. No.: 16/033,793

(22) Filed: Jul. 12, 2018

(65) Prior Publication Data
US 2020/0020058 A1    Jan. 16, 2020

(51) Int. Cl.
*G06Q 50/18*    (2012.01)
*G06F 16/93*    (2019.01)
*G06N 20/00*    (2019.01)
*G06F 16/28*    (2019.01)

(52) U.S. Cl.
CPC ............ *G06Q 50/18* (2013.01); *G06F 16/288* (2019.01); *G06F 16/93* (2019.01); *G06N 20/00* (2019.01)

(58) Field of Classification Search
CPC ....... G06Q 50/18; G06F 16/93; G06F 16/288; G06N 20/00
USPC .......................................................... 705/311
See application file for complete search history.

(56) References Cited

U.S. PATENT DOCUMENTS

| | | | |
|---|---|---|---|
| 6,772,149 B1 * | 8/2004 | Morelock | G06F 16/334 |
| 8,332,384 B2 | 12/2012 | Kemp | |
| 8,438,158 B2 | 5/2013 | Kemp | |
| 8,489,587 B2 | 7/2013 | Kemp | |
| 9,298,700 B1 * | 3/2016 | Jesensky | G06F 40/289 |
| 2002/0165843 A1 * | 11/2002 | Takahashi | G06Q 10/10 706/47 |
| 2003/0046277 A1 * | 3/2003 | Jackson | G06F 16/30 |
| 2006/0149720 A1 * | 7/2006 | Dehlinger | G06F 16/313 |
| 2007/0208719 A1 * | 9/2007 | Tran | G06F 16/951 |
| 2011/0289105 A1 * | 11/2011 | Hershowitz | G06F 40/169 707/769 |
| 2015/0269691 A1 * | 9/2015 | Bar Yacov | G06F 16/3334 705/311 |
| 2016/0103823 A1 * | 4/2016 | Jackson, Jr. | G06F 40/205 704/9 |
| 2017/0161619 A1 * | 6/2017 | Franceschini | G06N 5/022 |

(Continued)

OTHER PUBLICATIONS

Al-Kofani et al., "A Machine Learning Approach to Prior Case Retrieval," [online], ICAIL '01: Proceedings of the 8th international conference on Artificial Intelligence and Law, May 2001, pp. 88-93. Available at: < https://dl.acm.org/doi/abs/10.1145/383535.383545 > (Year: 2001).*

(Continued)

*Primary Examiner* — Richard W. Crandall
(74) *Attorney, Agent, or Firm* — Chiesa Shahinian & Giantomasi PC (57) ABSTRACT

Systems and methods are described for identifying a legal concept associated with a legal document. A statement and an associated citation to a cited document are identified in a legal document. A correspondence between a statement in the cited document and the statement identified in the legal document is determined using a trained machine learning model. A legal concept associated with the legal document is identified based on the correspondence.

15 Claims, 9 Drawing Sheets

(56) References Cited

U.S. PATENT DOCUMENTS

2018/0232358 A1* 8/2018 Badenes ................ G06F 40/30

OTHER PUBLICATIONS

Casetext Online Legal Research Engine, https://casetext.com/, retrieved from the internet on Jul. 2, 2018, 1 page.
Judicata Online Legal Research platform, https://www.judicata.com/, retrieved from the internet on Jul. 2, 2018, 2 pages.
Ravel Law Online Analytical Research Engine, http://ravellaw.com/, retrieved from the internet on Jul. 2, 2018, 1 page.

* cited by examiner

```
┌─────────────────────────────────┐
│ Identify a statement and an     │
│ associated citation to a cited  │
│ document in the respective      │
│ portion of the legal document   │
│ 402                             │
└─────────────────────────────────┘
              │
              ▼
┌─────────────────────────────────┐
│ Determine a correspondence      │
│ between a statement in the      │
│ cited document and the          │
│ statement identified in the     │
│ respective portion of the legal │
│ document                        │
│ 404                             │
└─────────────────────────────────┘
              │
              ▼
┌─────────────────────────────────┐
│ Identify a legal concept        │
│ associated with the respective  │
│ portion of the legal document   │
│ based on the correspondence     │
│ 406                             │
└─────────────────────────────────┘
```

Identify one or more candidate citations from the respective portion of the legal document
502

Identify one or more candidate statements from the respective portion of the legal document
504

Identify one or more sentence boundaries from the respective portion of the legal document
506

Parse the respective portion of the legal document based on the one or more citations, the one or more candidate statements, and the one or more sentence boundaries
508

Determine one or more candidate statements that correspond with a citation using the parsed respective portion of the legal document
510

IDENTIFICATION OF LEGAL CONCEPTS IN LEGAL DOCUMENTS

BACKGROUND

The present invention relates generally to document processing, and more particularly to identifying legal concepts in legal documents.

There is currently a vast amount of information readily available to a user on any given subject. However, the ability to identify information relevant to the user from such a vast amount of information remains a challenge. Conventionally, documents are organized and indexed to facilitate access to documents relevant to a user by manually reviewing each document to identify concepts associated with the document and tagging the document with the associated concepts. However, such a conventional approach is time consuming, expensive, and prone to human error.

The legal field presents particular challenges in identifying relevant documents from a vast amount of legal information. The legal practice involves providing advice on how the law applies to past and prospective activities, which requires an understanding of the law and how the law should be applied. Providing such legal advice may require performing legal research to identify relevant legal documents from a database of legal reference materials, such as, e.g., court opinions, digests, secondary sources, etc. One conventional approach to facilitate legal research is for an editor to manually review each court opinion (or any other legal document) to identify legal concepts associated with the court opinion or particular portions of the court opinion. The legal concepts associated with a court opinion are often compiled into issue summaries known as headnotes, which are offered as annotatations to the opinion. Such a conventional approach for facilitating legal research is time consuming, expensive, and prone to human error.

BRIEF SUMMARY

In one embodiment, systems and methods are provided for identifying a legal concept associated with a legal document. A statement and an associated citation to a cited document are identified in a legal document. A correspondence between a statement in the cited document and the statement identified in the legal document is determined using a trained machine learning model. A legal concept associated with the legal document is identified based on the correspondence.

In one embodiment, the statement identified in the legal document is identified as the legal concept.

In one embodiment, the legal concept associated with the legal document is identified by determining a machine-readable representation of the citation to the cited document and retrieving the cited document based on the machine-readable representation. Possible statements identified in the retrieved cited document are compared with the statement identified from the legal document. The possible statements may be filtered prior to the comparison.

In one embodiment, the statement and the associated citation to the cited document in a legal document are identified based on candidate citations identified in the legal document, candidate statements identified in the legal document, and sentence boundaries identified in the legal document. In particular, the legal document is parsed based on the candidate citations identified in the legal document, the candidate statements identified in the legal document, and the sentence boundaries identified in the legal document, and a trained machine learning model is applied to identify the statement and the associated citation to the cited document in the legal document based on the parsed legal document.

In one embodiment, other legal documents associated with the legal concept are identified and a map is generated showing a relationship between the legal document and the other legal documents. The map may be generated by generating a directed graph having nodes representing the legal document and the other legal documents, and edges connecting the nodes. The edges are directed from a node representing a citing document to a node representing a cited document.

These and other advantages of the invention will be apparent to those of ordinary skill in the art by reference to the following detailed description and the accompanying drawings.

DETAILED DESCRIPTION

Figure 1:
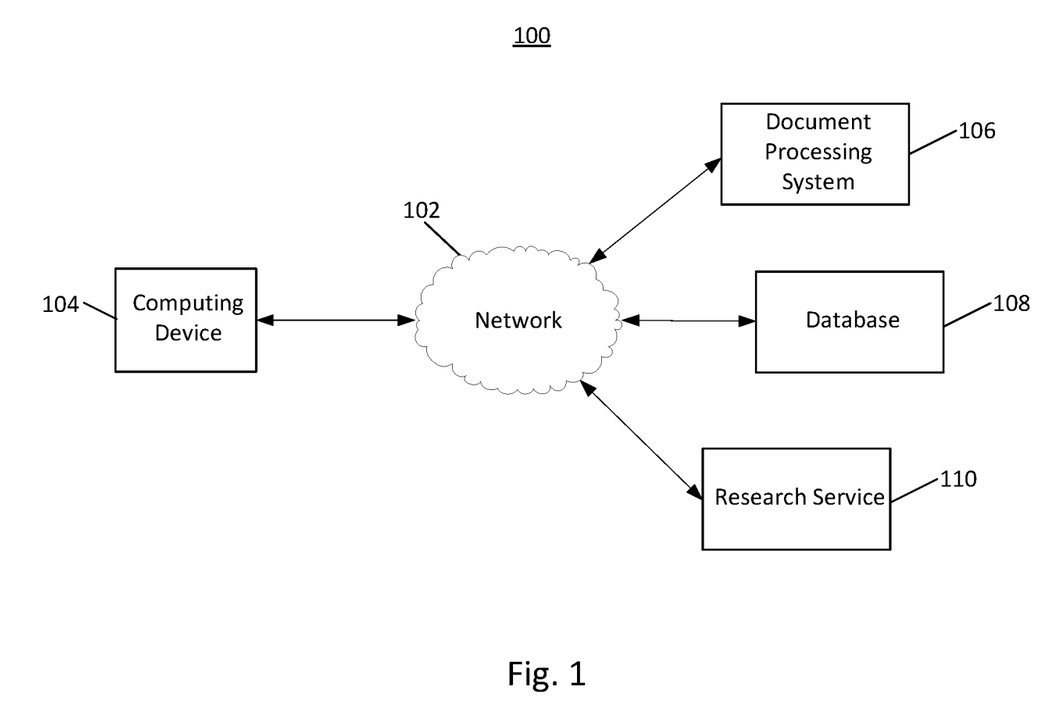
FIG. 1 shows a high-level block diagram of a network architecture, in accordance with one embodiment.

FIG. 1 shows a high-level block diagram of a network architecture 100, in accordance with one or more embodiments. An end user of a computing device 104 in architecture 100 interacts with a research service 110 to identify relevant documents stored in database 108 via network 102. The documents stored in database 108 may be of any type. For example, the documents stored in database 108 may comprise academic papers, scientific papers, medical records, etc. Network 102 may include any type of network or combinations of different types of networks, and may be implemented in a wired and/or a wireless configuration. For example, network 102 may include one or more of the Internet, an intranet, a local area network (LAN), a wide area network (WAN), a Fibre Channel storage area network (SAN), a cellular communications network, etc.

Computing device 104 may comprise any suitable computing device, such as, e.g., a computer, a tablet, a mobile device, etc., to facilitate an end user to interact with research service 110. Research service 110 may comprise any service facilitating the identification of information relevant to the end user, such as, e.g., a search engine. The end user may interact with research service 110 via an interface of a web browser executing on computing device 104, an application executing on computing device 104, an app executing on computing device 104, or any other suitable interface for interacting with research service 110. In one example, an end user using user device 104 may interact with a software as a service (SaaS) application hosted by research service 110 to facilitate the identification of relevant documents.

In one conventional approach, an end user identifies relevant documents based on concepts that have been manually identified in a document. However, such a conventional approach is time consuming, expensive, and prone to human error.

Figure 2:
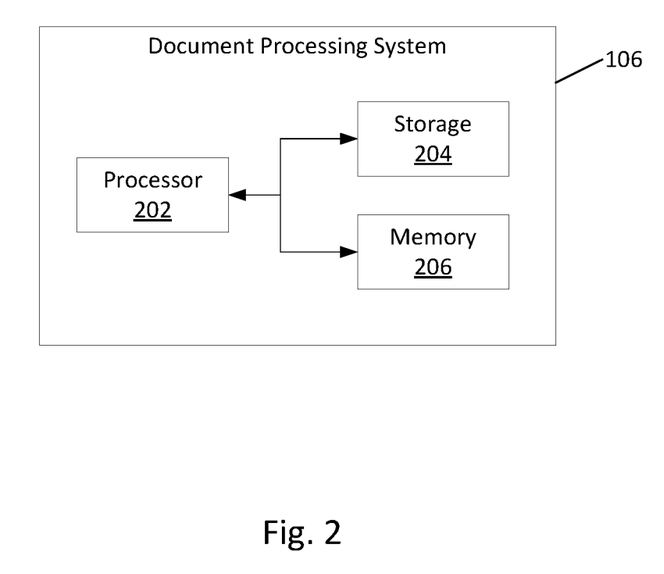
FIG. 2 shows a high-level block diagram of a computing device for implementing a document processing system, in accordance with one embodiment.

Advantageously, a document processing system 106 is provided for processing documents to automate the identification of concepts associated with a document in an efficient and accurate manner. Document processing system 106 may be implemented as shown in FIG. 2, as discussed below.

In one embodiment, document processing system 106 is configured to identify concepts associated with documents stored in database 108. The identified concepts and the association between the identified concepts and the documents may be, for example, stored in document processing system 106 (storage 204 shown in FIG. 2) and retrieved by research service 110 as needed, transmitted to research service 110 and stored in memory (not shown), or transmitted to database 108 and stored in memory (not shown). Accordingly, an end user using computing device 104 may interact with research service 110 to identify documents in database 108 that are relevant to the end user based on the concepts associated with the documents automatically identified by document processing system 106.

In one particular embodiment, document processing system 106 is configured to determine legal concepts associated with legal documents stored in database 108. The legal concepts may be principles of law identified or extracted from court opinions or any other legal document, such as, e.g., memoranda, briefs, digests, secondary sources, etc.

While architecture 100 of FIG. 1 shows document processing system 106, database 108, and research service 110 as discrete components, it should be understood that document processing system 106, database 108, and/or research service 110 may be combined and/or separated into any number of discrete components.

FIG. 2 shows a high-level block diagram of a computing device for implementing document processing system 106, in accordance with one or more embodiments. Document processing system 106 may be implemented as a computing device comprising memory 206 (e.g., random access memory) and storage 204 (e.g., persistent storage) operatively coupled to one or more processors 202. Storage 204 may store computer program instructions to perform, e.g., the steps of FIGS. 3-6 and 8 for determining legal concepts associated with a legal document. The computer program instructions may be loaded into memory 206 and executed by processor 202. It should be understood that document processing system 106 may include additional elements, such as, e.g., a network interface, an input/output interface, etc. and that FIG. 2 is a high level representation of some of the components of such a computing device for illustrative purposes.

Figure 3:
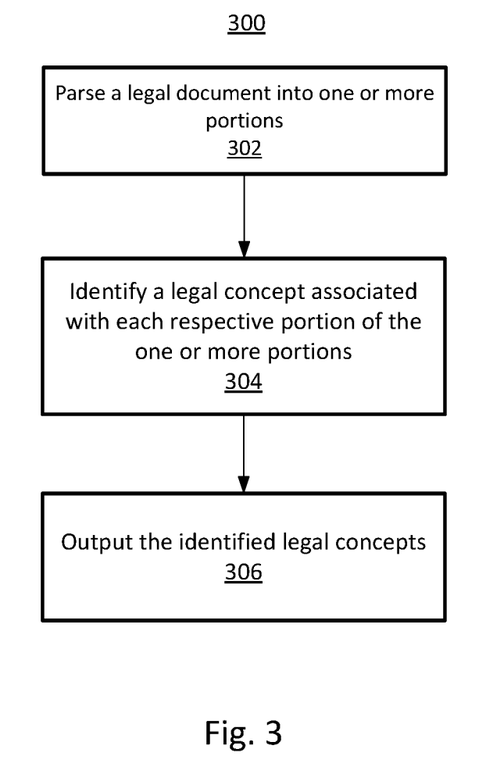
FIG. 3 shows a flow diagram of a method for identifying a legal concept associated with portions of a legal document, in accordance with one embodiment.

FIG. 3 shows a method 300 for identifying legal concepts associated with a legal document, in accordance with one or more embodiments. Method 300 will be described with respect to architecture 100 of FIG. 1 and document processing system 106 of FIG. 2. In one embodiment, method 300 may be performed by processor 202 of document processing system 106 shown in FIG. 2. In one embodiment, the steps of method 300 may be performed for each legal document stored in database 108 to identify a legal concept associated with each legal document.

While embodiments disclosed herein will be described with respect to identifying a legal concept associated with a legal document, it should be understood that the present invention is not so limited. The present invention may be applicable to identify any type of concept associated with any type of document, and is not limited to the legal field. For example, the present invention may be employed to identify a concept associated with an academic paper, a scientific paper, a medical document, etc.

At step 302, a legal document is parsed into one or more portions. In one embodiment, each of the one or more portions of the legal document corresponds to a different paragraph of the legal document. However, the one or more portions may represent portions of the legal document at any level of granularity. For example, the one or more portions may correspond to a number of sentences of the legal document, a number of lines of the legal document, sections of the legal document, the entire legal document, etc. In one embodiment, the legal document is parsed into the one or more paragraphs. Sentences are identified within said paragraphs, and statements are identified within said sentences.

At step 304, a legal concept associated with each respective portion of the one or more portions of the legal document is identified. In one embodiment, a legal concept associated with each respective portion of the legal document may be identified according to method 400 of FIG. 4, described in detail below.

At step 306, the identified legal concept associated with each respective portion of the legal document is output. In one embodiment, the identified legal concepts and the association between the identified legal concepts and respective portions of the legal document are stored in a table that associates the legal concepts with the respective portions of the legal document. The table may be stored in storage 204 of document processing system 106 (shown in FIG. 2) and retrieved by research service 110 as needed, transmitted to research service 110 and stored in memory (not shown), or transmitted to database 108 and stored in memory (not shown).

Advantageously, method 300 provides for the automated identification of legal concepts associated with portions of a legal document to thereby allow an end user (of computing device 104 of FIG. 1) to efficiently identify relevant legal documents based on the identified legal concepts.

Figure 4:
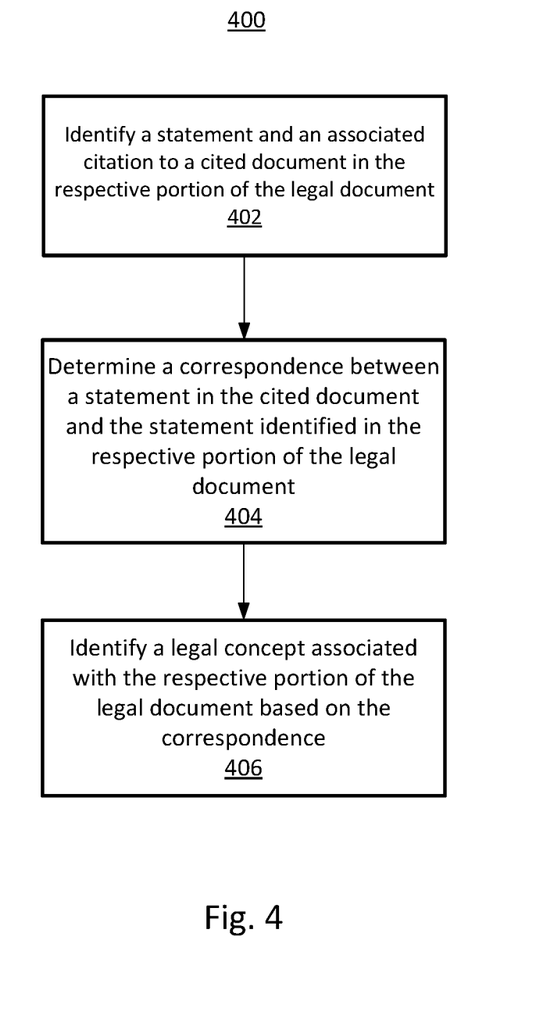
FIG. 4 shows a flow diagram of a method for identifying a legal concept associated with a respective portion of a legal document, in accordance with one embodiment.

FIG. 4 shows a method 400 for identifying a legal concept associated with a respective portion of a legal document. Method 400 may be performed to identify a legal concept associated with the respective portion of the legal document to implement step 304 of FIG. 3. In one embodiment, method 400 is repeated for each respective portion of the one or more portions of the legal document parsed at step 302 of FIG. 3.

At step 402, a statement and an associated citation to a cited document are identified in the respective portion of the legal document. The statement and the associated citation to the cited document may be identified in the respective portion of the legal document according to method 500 of FIG. 5, described in detail below.

At step 404, a correspondence between a statement in the cited document and a statement identified in the respective portion of the legal document is determined. There is a correspondence when the statement in the cited document and the statement identified in the respective portion of the legal document express the same concept or idea. The correspondence between the statement in the cited document and the statement in the respective portion of the legal document may be determined according to method 700 of FIG. 7, described in more detail below.

At step 406, a legal concept associated with the respective portion of the legal document is identified based on the correspondence. In one embodiment, the statement identified in the respective portion of the legal document is identified as the legal concept. The legal concept associated with the respective portion of the legal document is identified at step 406 as the legal concept identified at step 304 of FIG. 3.

Figure 5:
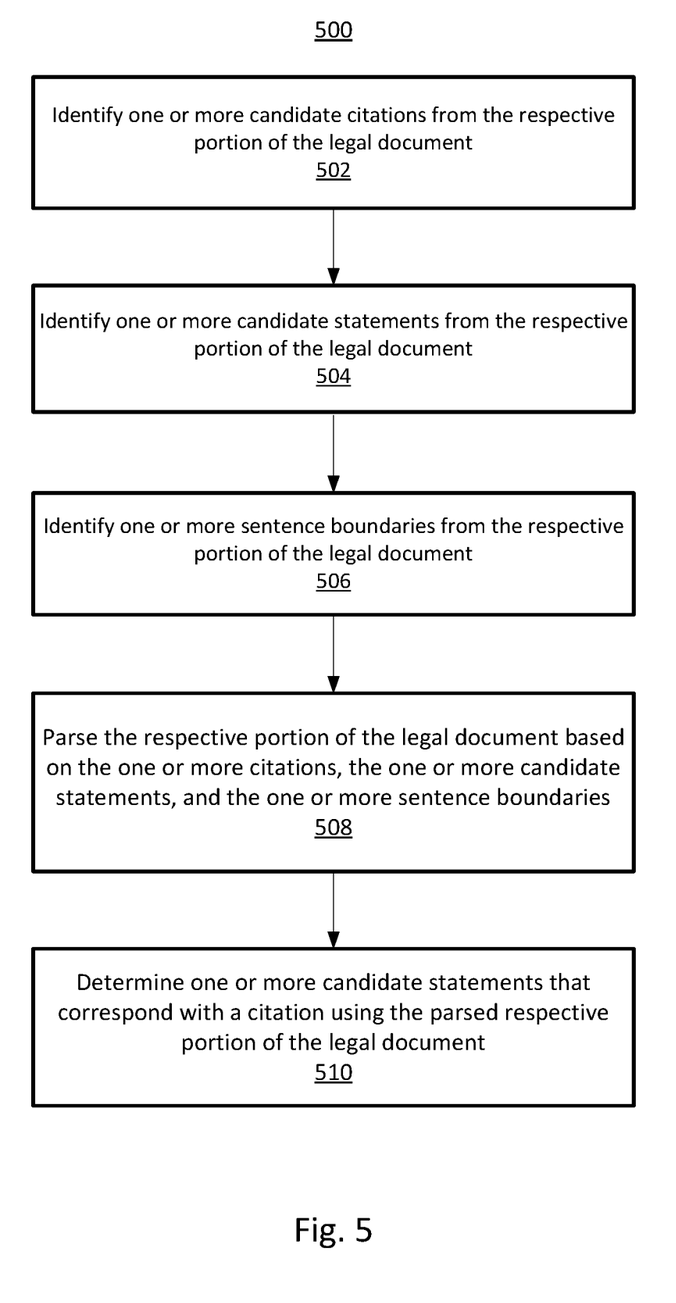
FIG. 5 shows a flow diagram of a method for identifying a statement and an associated citation to a cited document from a respective portion of a legal document, in accordance with one embodiment.

FIG. 5 shows a method 500 for identifying a statement and an associated citation to a cited document from a respective portion of a legal document, in accordance with one or more embodiments. Method 500 may be performed to identify a statement and an associated citation to a cited document from a respective portion of a legal document to implement step 402 of FIG. 4. Steps 502, 504, and 506 of method 500 may be performed in any order.

At step 502, one or more candidate citations are identified from the respective portion of the legal document. In one embodiment, the one or more candidate citations are identified from the respective portion of the legal document using a trained machine learning model trained to predict the identification of citations in the respective portion of the legal document. The machine learning model may be trained and applied according to workflow 800 of FIG. 8, described in further detail below. The one or more candidate citations are candidates for associating with the one or more candidate statements identified at step 504 below.

The machine learning model is trained during a training stage to predict the identification of citations from the respective portion of the legal document using input training data. The input training data may comprise portions (e.g., paragraphs) of legal documents annotated to identify the citations. Features are extracted from the input training data to train the machine learning model. In one embodiment, the text of the portion of the legal document is tokenized (i.e., separated into tokens) using a conventional regular expression based tokenizer. Attributes of the tokens are then identified. The attributes may include the token text, token length, token type (e.g., alphabetic, numerical, punctuation), token case (upper, lower, title), the presence of whitespace surrounding the token, the proximity of the token to parentheses, or any other suitable attribute. Features may be created from the attributes of tokens appearing in a window surrounding the token of interest, singularly or in any combination. For example, a common feature is a tri-gram that consists of the text of the token before the instant token, the text of the instant token, and the text of the token after the instant token. The windows surrounding the token of interest may be varied to create features of various lengths, e.g., ranging from three tokens before to three tokens after the instant token, or any range within). The machine learning model is trained to predict the identification of citations from the respective portion of the legal document using the extracted features. In one embodiment, the machine learning model is a conditional random fields (CRF) model, however any suitable model may be used (e.g., support vector machine (SVM), neural network).

The trained machine learning model is applied during an online stage to predict the identification of citations from the respective portion of the legal document. Features are extracted from the respective portion of the legal document. The features extracted from the respective portion of the legal document will include the same features as extracted during the training stage. The trained machine learning model is used to predict the identification of citations from the respective portion of the legal document based on the extracted features.

At step 504, one or more candidate statements are identified from the respective portion of the legal document. A statement refers to one or more sentences or phrases of substantive content in the legal document. For example, a statement in a court opinion may include a sentence representing the words of the authoring judge. The one or more candidate statements are candidates for associating with the one or more candidate citations identified at step 502.

In one embodiment, the one or more candidate statements are identified from the respective portion of the legal document using a trained machine learning model. The machine learning model (e.g., a CRF model) is trained using portions of legal documents annotated to identify candidate statements as input training data. The features extracted from the input training data may include the same or similar features as discussed above with respect to step 502. The trained machine learning model is applied to predict the identification of one or more candidate statements from the respective portion of the legal document. The machine learning model may be trained and applied according to workflow 800 of FIG. 8, described in further detail below.

If no citations are identified at step 502 or if no candidate statements are identified at step 504, method 500 (and thus step 402 of FIG. 4) ends and step 304 of FIG. 3 is repeated for a next respective portion of the legal document.

At step 506, one or more sentence boundaries are identified from the respective portion of the legal document. In one embodiment, the one or more sentence boundaries are identified from the respective portion of the legal document using a trained machine learning model. The machine learning model (e.g., a CRF model) is trained using portions of legal documents annotated to identify sentence boundaries as input training data. The features extracted from the input training data may include the same or similar features as discussed above with respect to step 502. The trained machine learning model is applied to predict the identification of sentence boundaries from the respective portion of the legal document. The machine learning model may be trained and applied according to workflow 800 of FIG. 8, described in further detail below.

At step 508, the respective portion of the legal document is parsed based on the one or more citations identified at step 502, the one or more candidate statements identified at step 504, and the one or more sentence boundaries identified at step 506. In one embodiment, the one or more sentence boundaries are applied to ensure that any statement in the portion of the legal document that traverses a sentence boundary is divided into two distinct statements.

At step 510, one or more candidate statements that correspond with a citation are determined using the parsed respective portion of the legal document. In one embodiment, the one or more candidate statements that correspond with a citation are determined using a trained machine learning model. The machine learning model is trained using portions of legal documents annotated to identify candidate statements and associated citations as input training data. The features extracted from the input training data may include: the number of statements in the sentence; the type of cited document (court opinion, statute, exhibit); whether any signal and explanatory phrases appear in proximity to the statement; the order of the statement and citation; whether the statement appears in a parenthetical; the number of intervening statements, case citations, and case names between the statement and citation; or any other suitable feature. The trained machine learning model is applied to predict the identification of candidate statements and associated citations from the respective portion of the legal document. In one embodiment, the machine learning model is a decision tree model, however any suitable model may be used. The machine learning model may be trained and applied according to workflow 800 of FIG. 8, described in further detail below.

One or more pairs of candidate statements and associated citations are determined at step 510 as the identified statement and the associated citation at step 402 of FIG. 4.

Figure 6:
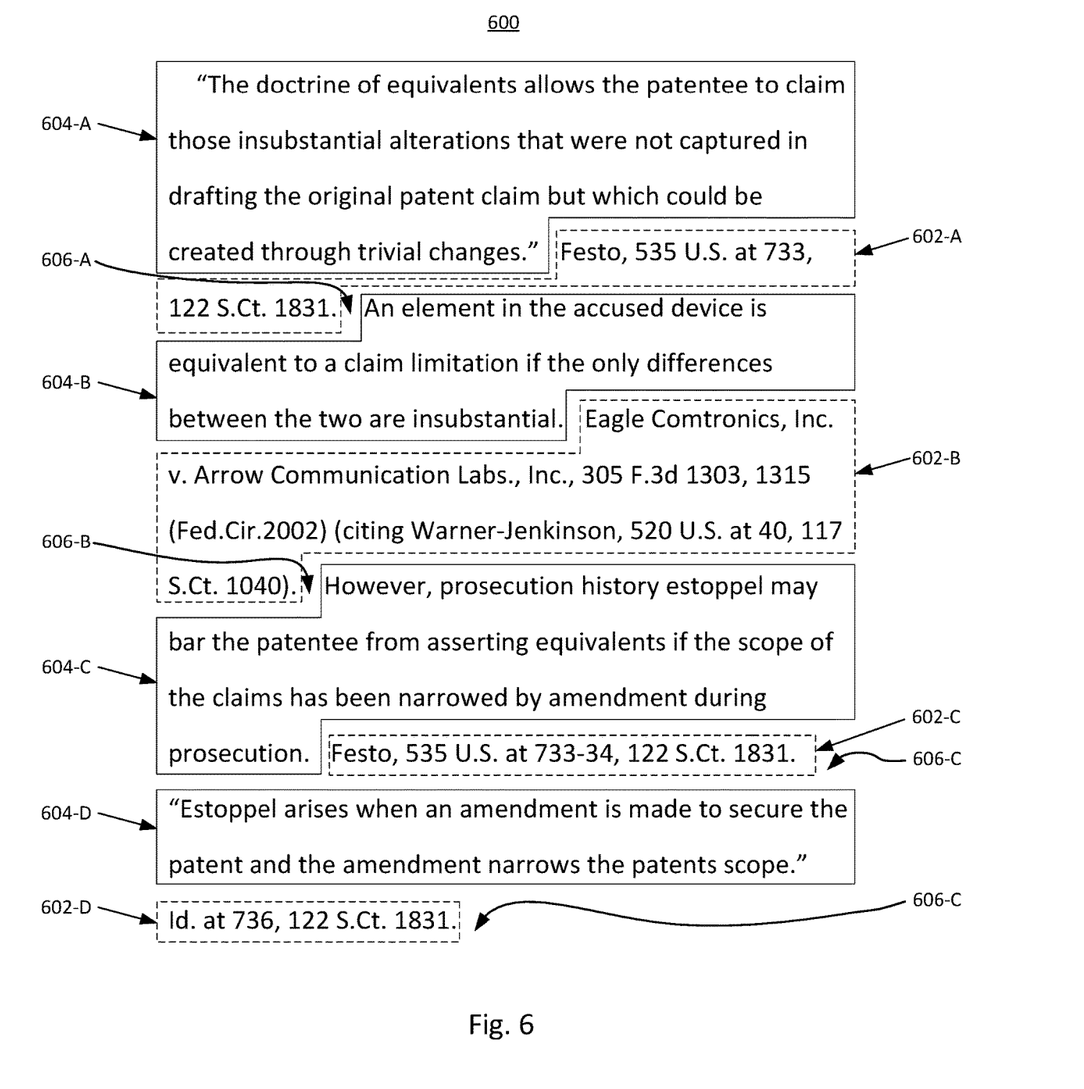
FIG. 6 shows an exemplary portion of a legal document, in accordance with one embodiment.

FIG. 6 shows an exemplary portion 600 of a legal document. Portion 600 includes citations 602-A, 602-B, 602-C, and 602-D identified at step 502 of FIG. 5, shown in FIG. 6 with dashed line boxes. Portion 600 also includes candidate statements 604-A, 604-B, 604-C, and 604-D identified at step 504 of FIG. 5, shown in FIG. 6 with solid line boxes. Portion 600 further includes sentence boundaries 606-A, 606-B, 606-C, and 606-D identified at step 506 of FIG. 5.

Statements and their associated citations shown in the exemplary portion 600 are shown below in Table 1. The associated citations for the statements may be determined by performing method 500 of FIG. 5.

TABLE 1

Statements and their associated citations.

| Statement | Associated Citation |
| --- | --- |
| "The doctrine of equivalents allows the patentee to claim those insubstantial alterations that were not captured in drafting the original patent claim but which could be created through trivial changes." | 535 U.S. 722, 733 |
| An element in the accused device is equivalent to a claim limitation if the only differences between the two are insubstantial. | 305 F.3d 1303, 1315 |
| However, prosecution history estoppel may bar the patentee from asserting equivalents if the scope of the claims has been narrowed by amendment during prosecution. | 535 U.S. 722, 733-34 |
| "Estoppel arises when an amendment is made to secure the patent and the amendment narrows the patents scope." | 535 U.S. 722, 736 |

Figure 7:
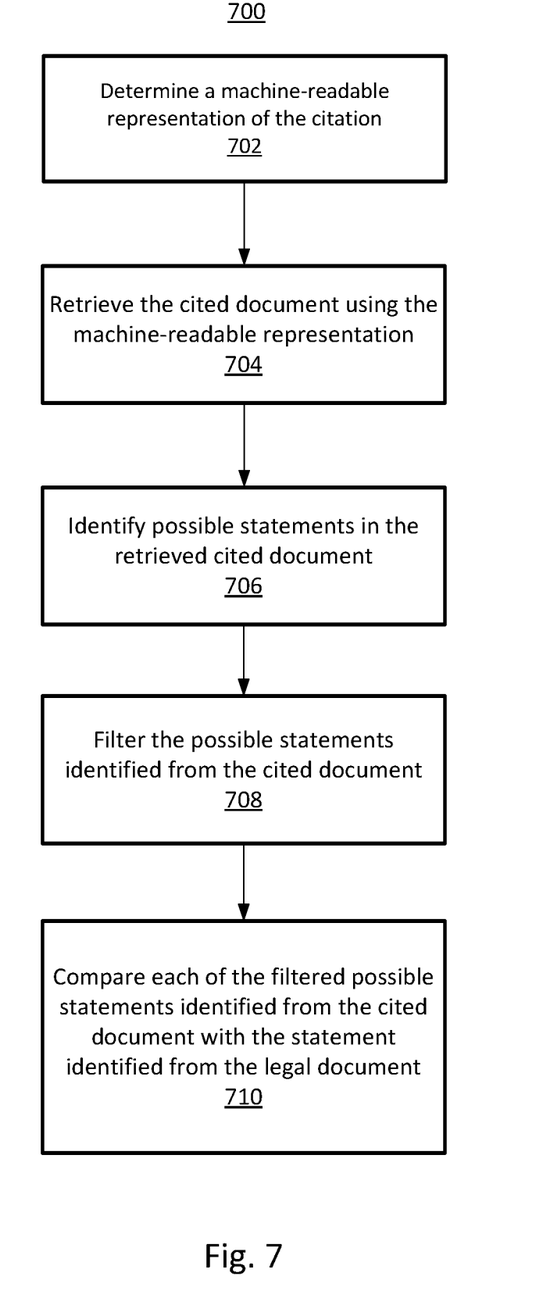
FIG. 7 shows a flow diagram of a method for identifying a statement in a cited document that corresponds to a statement identified in a respective portion of a legal document, in accordance with one embodiment.

FIG. 7 shows a method 700 for identifying a statement in a cited document that corresponds to a statement identified in a respective portion of the legal document, in accordance with one or more embodiments. Method 700 may be performed to identify a statement in a cited document that corresponds to a statement identified in a respective portion of the legal document to implement step 404 of FIG. 4.

At step 702, a machine-readable representation of the citation to the cited document is determined. The machine-readable representation of the citation to the cited document may be any suitable representation of the citation that a computing device can process. In one embodiment, the machine-readable representation of the citation may be a portion of the citation identifying a location where the cited document is published. For example, the machine-readable representation of citation 602-A in FIG. 6 may be "535 U.S. 722, 733", where "U.S." represents the court reporter where the cited document is published, "535" represents the volume of the court reporter where the cited document is published, "722" represents the first page of the cited document in the court reporter, and "733" represents the pin cite to a particular page of the court reporter.

In one embodiment, the machine-readable representation of the citation to the cited document is identified or determined using a trained machine learning model. The machine learning model (e.g., a CRF model) is trained using citations annotated to identify a machine-readable representation as input training data. The features extracted from the input training data may include the same or similar features as discussed above with respect to step 502. The trained machine learning model is applied to predict the identification of the machine-readable representation from the citation to the cited document. The machine learning model may be trained and applied according to workflow 800 of FIG. 8, described in further detail below.

At step 704, the cited document is retrieved (from database 108 of FIG. 1) using the machine-readable representation. At step 706, possible statements are identified in the retrieved cited document. In one embodiment, the possible statements are identified in the cited document using a trained machine learning model, such as the trained machine learning model trained and applied to perform step 504 of FIG. 5. Step 706 may be performed at any time prior to step 708, such as during a prior pre-processing step.

At step 708, the possible statements identified in the cited document are (optionally) filtered. Since there may be hundreds of possible statements identified in the cited document, the possible statements are filtered to remove obvious non-matching statements from the possible statements. The possible statements that are filtered may include possible statements that are not legally substantive, such as, e.g., statements describing the procedural history or background facts of the legal dispute. In one embodiment, the filtering is less computationally expensive than the comparing performed at step 710. The filtering may be performed using any suitable filtering technique.

In one embodiment, the possible statements identified in the cited document are filtered using a trained machine learning model. The machine learning model (e.g., a Bilenko blocking model) is trained using pairs of statements annotated to indicate whether the statements in the pair match as input training data. The features extracted from the input training data may include distance measures (e.g., cosine similarity, Jaccard similarity, etc.), character measures (e.g., percentage of particular types of characters, difference in counts between particular types of characters, etc.), statement lengths, and/or any other suitable feature. The trained machine learning model is applied to predict whether each possible statement matches the statement identified in the legal document. Non-matching possible statements are filtered or removed from the set of possible statements. The machine learning model may be trained and applied according to workflow 800 of FIG. 8, described in further detail below.

At step 710, each of the filtered statements identified in the cited document is compared with the statement identified from the legal document to identify one or more possible statements that correspond or match with the statement identified in the legal document. The statements correspond when they express the same concept or idea. The result of the comparison may be a binary decision (yes or no), a multi-grade scale, or any other suitable result. In one embodiment, the result of the comparison is the following four grade scale: 1) the two statements clearly do not express the same concept or idea; 2) the two statements do not express the same concept or idea; 3) the two statements express the same concept or idea; 4) the two statements clearly express the same concept or idea. Other suitable multi-grade scales may also be employed.

In one embodiment, each respective possible statement identified in the cited document is compared with the statement identified in the legal document using a trained machine learning model to determine a correspondence between the respective possible statement and the statement identified in the legal document. The machine learning model (e.g., a linear support vector machine or convolutional neural network) is trained using pairs of statements annotated to indicate whether the statements in the pair correspond or match as input training data. The features extracted from the input training data may include measures of similarity between the tokenized statement pairs, such as, e.g., length ratio, Jaccard similarity, Sorensen-Dice index, Levenshtein distance, longest common subsequence (LCS) distance, etc. The measures of similarity may be performed between pairs of statements that have been processed to remove punctuation, convert all words to one case (upper or lower), or remove stop words (e.g., commonly occurring words). A conventional stemming algorithm (e.g., Porter, Snowball, etc.) optionally may be applied to the remaining tokens. The trained machine learning model is applied to predict whether the respective possible statement identified in the cited document and the statement identified in the legal document correspond. In one embodiment, the trained machine learning model results in a level of correspondence between the respective possible statement in the cited document and the statement identified in the legal document. For example, the level of correspondence between the respective possible statement in the cited document and the statement identified in the legal document may be a grade of the four grade scale described above.

Based on the result of the comparing at step 710, one or more possible statements are identified at step 404 of FIG. 4 as the statement in the cited document that corresponds to the statement identified in the respective portion of the legal document. In one embodiment, using the four grade scale described above, each respective statement that is assigned grades 3) or 4) are identified to step 404 as the statement in the cited document that corresponds to the statement identified in the respective portion of the legal document. A user (e.g., a practitioner) can select a level of correspondence between statements to achieve a desired result. For example, the correspondence between the statement in the respective portion of the legal document and the statement in the cited document (i.e., whether the statements express the same concept or idea) can be judged by applying different threshold probabilities to the binary decision or to one or more of the classes in the multi-grade scale. Applying a higher threshold for correspondence is likely to yield a group of statements that are more closely related in language.

Figure 8:
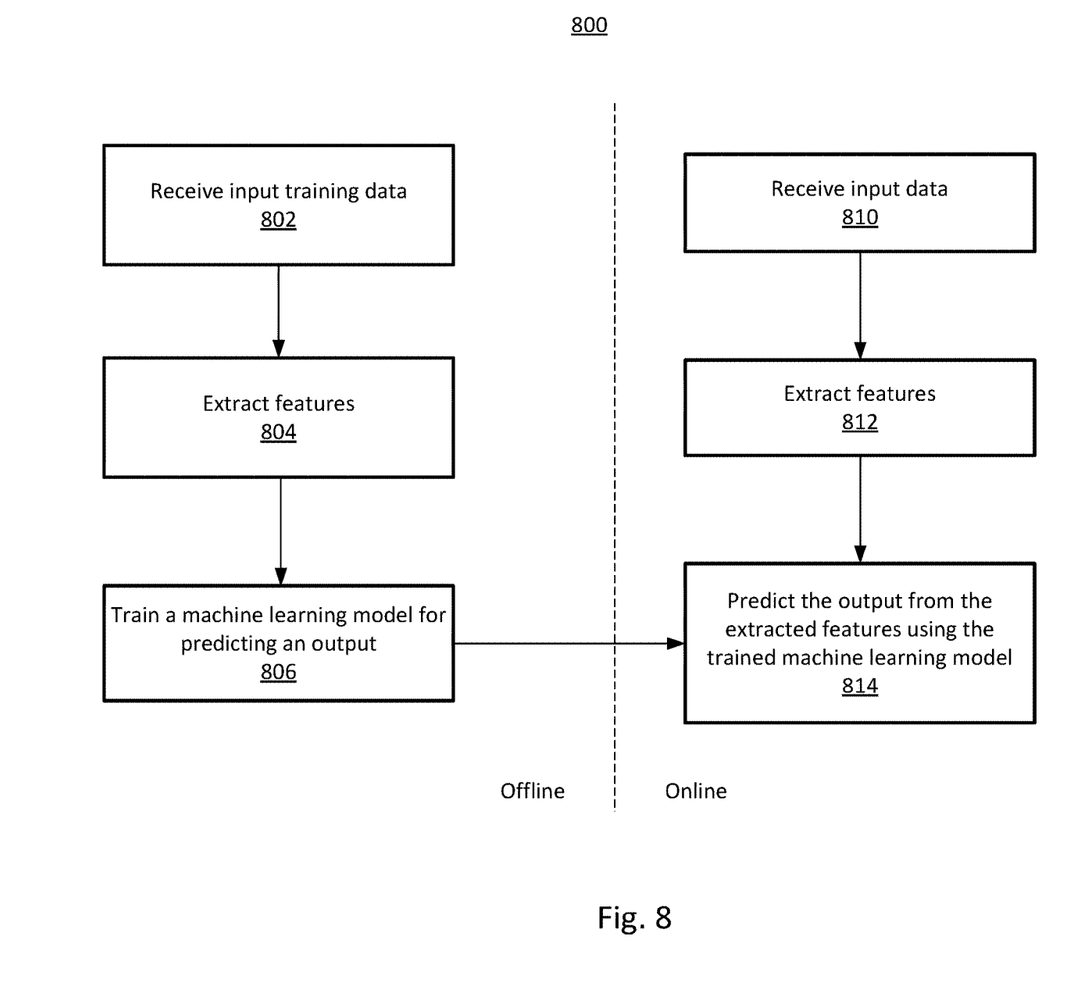
FIG. 8 shows a flow diagram of a workflow for training and applying a machine learning model to predict an outcome, in accordance with one embodiment.

FIG. 8 shows a workflow 800 for training and applying a machine learning model to predict an output, in accordance with one or more embodiments. A machine learning model is a function that maps an input to an output based on training input-output pairs. Blocks 802-806 show an offline or training stage for training a machine learning model and blocks 810-814 show an online stage for applying the trained machine learning model. Workflow 800 may be applied to train and apply a machine learning model to predict any output. In one embodiment, workflow 800 may be applied to train and apply a machine learning model to perform, e.g., steps 502, 504, 506, and 510 of FIG. 5 and steps 702, 706, 708 and 710 of FIG. 7, as described above.

During the offline or training stage, at step 802, input training data is received. The input training data may be any suitable data for training a machine learning model to predict any output. The input training data is annotated or tagged to indicate the output to be predicted. The input training data may be manually annotated or tagged by one or more users during a prior pre-processing step. At step 804, features are extracted from the input training data. The features may include any suitable features for training a machine learning model to predict the output. At step 806, a machine learning model is trained to predict the output based on the extracted features. In one embodiment, the machine learning models may be trained using well known methods.

During the online stage, at step 810, input data is received. The input data received at this step represents unseen data from which the output is to be predicted. At step 812, features are extracted from the input data. The features extracted from the input data may include the features extracted at step 804 from the input training data during the training phase. At block 814, an output is predicted from the extracted features using the trained machine learning model.

Figure 9:
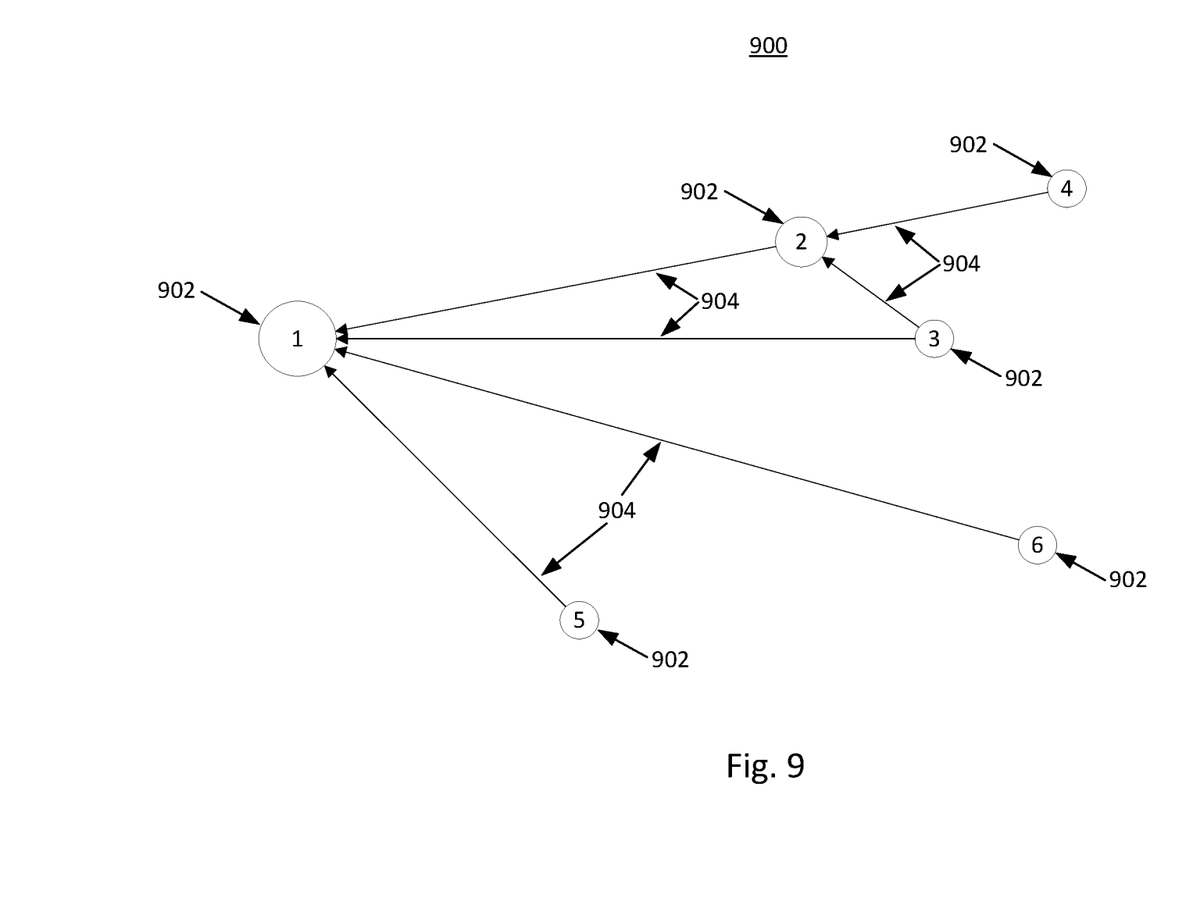
FIG. 9 shows a mapping of legal documents associated with a particular legal concept, in accordance with one embodiment.

FIG. 9 shows a mapping 900 of legal documents associated with a particular legal concept, in accordance with one or more embodiments. Mapping 900 may be generated in response to an end user of computing device 104 of FIG. 1 interacting with research service 110. For example, an end user using computing device 104 may interact with research service 110 to perform legal research on the particular legal concept. The legal research may lead to search results comprising a listing of legal documents associated with the particular legal concept. Mapping 900 may be displayed to an end user on a user interface (not shown) of computing device 104 to visually depict relationships between the legal documents associated with the particular legal concept.

Mapping 900 may be generated by identifying one or more legal concepts associated with each legal document (stored in database 108). In one embodiment, the one or more legal concepts associated with each legal document are identified by performing the steps of method 300 of FIG. 3 for each legal document. All legal documents associated with a particular legal concept are identified to generate a network of the legal documents associated with the particular legal concept. The network of legal documents associated with the particular legal concept is represented as mapping 900 to show the relationship between the legal documents.

In one embodiment, the network of legal documents associated with the particular legal concept may be generated by comparing representative legal concepts associated with each subnetwork in a pair of subnetworks with each other to determine if the subnetworks express a same legal concept. A subnetwork represents one or more legal documents associated with a same legal concept. The representative (or "canonical") legal concept is determined for each subnetwork by selecting the legal concept associated with a legal document in the subnetwork that is most similar to (or least different from) the legal concepts associated with the other legal documents in the subnetwork. The similarity between legal concepts can be assessed using any conventional similarity or distance measure, such as, e.g., term frequency-inverse document frequency (TFIDF) weighted cosine similarity, edit distance, etc. In one embodiment, the mean TFIDF weighted term vector is calculated across all legal concepts in the subnetwork, and the legal concept with the TFIDF weighted vector most similar to the average vector is determined to be the representative legal concept for the subnetwork. In an alternative embodiment, the legal concept that is cited by the most legal documents within the subnetwork is determined to be the representative concept.

The comparison of representative legal concepts may be performed using the trained machine learning model trained and applied at step 710 of workflow 700 in FIG. 7. If the comparison indicates that representative legal concepts represent a same legal concept, the subnetworks are merged into a larger, composite network. In one embodiment, the comparison indicates that representative legal concepts represent a same legal concept when the result of the comparison satisfies a predefined threshold. The comparison may be repeated between the composite network and each remaining subnetwork until the subnetworks are exhausted (i.e., no results of comparisons between the remaining subnetworks meet the predefined threshold). The comparison of representative legal concepts prevents subnetworks that express different legal concepts from merging, an undesirable phenomenon commonly described as "chaining."

Once a composite network is created from component subnetworks, an optional pruning step may be performed to exclude legal documents associated with legal concepts that are inconsistent with the common legal concept expressed by the legal concepts in the composite network. In one embodiment, a representative legal concept is chosen for the composite network as described above, and the representative legal concept is compared with the legal concepts associated with each legal document in the composite network using the trained machine learning model trained and applied at step 710 of workflow 700 in FIG. 7. If the result of the comparison between the representative concept and a second concept does not meet a predefined threshold, the second concept is removed from the composite network. The pruned composite network is provided as the network of legal documents associated with the particular legal concept, represented as mapping 900.

In one embodiment, mapping 900 comprises a directed graph having nodes 902 representing legal documents associated with the particular legal concept and edges 904 connecting nodes 902. In one embodiment, a direction associated with edges 904 point from a node representing a citing legal document to a node representing a cited legal document to indicate that the citing legal document cites to the cited legal document. In one embodiment, the sizes of nodes 902 are based on a number of legal documents that cited to it. For example, a higher number of citing legal documents may result in a larger size of the node. In another example, only a seminal court opinion may be represented with a larger size node. In one embodiment, the seminal court opinion may be automatically identified as the court opinion that has the most number of citing legal documents citing to it, as the court opinion that does not cite to another court opinion for the particular legal concept, or as the earliest court opinion.

Systems, apparatuses, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be implemented within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the method steps described herein, including one or more of the steps of FIGS. 3-5 and 7-8. Certain steps of the methods described herein, including one or more of the steps of FIGS. 3-5 and 7-8, may be performed by a server or by another processor in a network-based cloud-computing system. Certain steps of the methods described herein, including one or more of the steps of FIGS. 3-5 and 7-8, may be performed by a client computer in a network-based cloud computing system. The steps of the methods described herein, including one or more of the steps of FIGS. 3-5 and 7-8, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIGS. 3-5 and 7-8, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

As described above, FIG. 2 shows a high-level block diagram of an exemplary computing device that may be used to implement document processing system 106. Computing device 104, database 108, and research service 110 shown in FIG. 1 may also be implemented by a similar computing device used to implement document processing system 106 shown in FIG. 2. Document processing system 106 includes a processor 202 operatively coupled to a data storage device 204 and a memory 206. Processor 202 controls the overall operation of document processing system 106 by executing computer program instructions that define such operations. The computer program instructions may be stored in data storage device 204, or other computer readable medium, and loaded into memory 206 when execution of the computer program instructions is desired. Thus, the method steps of FIGS. 3-6 and 8 can be defined by the computer program instructions stored in memory 206 and/or data storage device 204 and controlled by processor 202 executing the computer program instructions. For example, the computer program instructions can be implemented as computer executable code programmed by one skilled in the art to perform the method steps of FIGS. 3-6 and 8. Accordingly, by executing the computer program instructions, the processor 202 executes the method steps of FIGS. 3-6 and 8. Document processing system 106 may also include one or more network interfaces (not shown) for communicating with other devices via a network (e.g., network 102 of FIG. 1). Document processing system 106 may also include one or more input/output (I/O) devices (not shown) that enable user interaction with document processing system 106 (e.g., display, keyboard, mouse, speakers, buttons, etc.).

Processor 202 may include both general and special purpose microprocessors, and may be the sole processor or one of multiple processors of document processing system 106. Processor 202 may include one or more central processing units (CPUs), for example. Processor 202, data storage device 204, and/or memory 206 may include, be supplemented by, or incorporated in, one or more application-specific integrated circuits (ASICs) and/or one or more field programmable gate arrays (FPGAs).

Data storage device 204 and memory 206 each include a tangible non-transitory computer readable storage medium. Data storage device 204 and memory 206 may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices may include peripherals, such as a printer, scanner, display screen, etc. For example, input/output devices may include a display device such as a cathode ray tube (CRT) or liquid crystal display (LCD) monitor for displaying information to the user, a keyboard, and a pointing device such as a mouse or a trackball by which the user can provide input to processing system 108.

Any or all of the systems and apparatus discussed herein, including computing device 104, database 108, and research service 110 of FIG. 1 and document processing system 106 of FIGS. 1 and 2, may also be implemented using one or more computing devices.

One skilled in the art will recognize that an implementation of an actual computing device may have other structures and may contain other components as well, and that document processing system 106 of FIGS. 1 and 2 is a high level representation of some of the components of such a computing device for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for identifying a legal concept associated with a legal document, comprising:
    training a machine learning model for predicting an identification of statements and associated citations to cited documents in legal documents using training legal documents annotated to identify statements and associated citations;
    identifying a statement and an associated citation to a cited document in a legal document by determining that the statement corresponds with the associated citation to the cited document based on a type of the cited document using the trained machine learning model;
    determining a correspondence between a statement in the cited document and the statement identified in the legal document by comparing possible statements identified in the cited document with the statement identified from the legal document; and
    identifying a legal concept associated with the legal document as the statement identified in the legal document based on the correspondence.

2. The method as recited in claim 1, wherein determining a correspondence between a statement in the cited document and the statement identified in the legal document further comprises:
    determining a machine-readable representation of the citation to the cited document; and retrieving the cited document based on the machine-readable representation.

3. The method as recited in claim 1, wherein determining a correspondence between a statement in the cited document and the statement identified in the legal document further comprises:
    filtering the possible statements prior to the comparing.

4. The method as recited in claim 1, wherein identifying a statement and an associated citation to a cited document in a legal document comprises:
    identifying the statement and the associated citation to the cited document in the legal document based on candidate citations identified in the legal document, candidate statements identified in the legal document, and sentence boundaries identified in the legal document.

5. The method as recited in claim 4, wherein identifying the statement and the associated citation to the cited document in the legal document based on candidate citations identified in the legal document, candidate statements identified in the legal document, and sentence boundaries identified in the legal document comprises:
    parsing the legal document based on the candidate citations identified in the legal document, the candidate statements identified in the legal document, and the sentence boundaries identified in the legal document; and
    applying the trained machine learning model to identify the statement and the associated citation to the cited document in the legal document based on the parsed legal document.

6. The method as recited in claim 1, further comprising: identifying other legal documents associated with the legal concept; and generating a map showing a relationship between the legal document and the other legal documents.

7. The method as recited in claim 6, wherein generating a map showing a relationship between the legal document and the other legal documents comprises:
generating a directed graph having nodes representing the legal document and the other legal documents, and edges connecting the nodes, the edges directed from a node representing a citing document to a node representing a cited document.

8. An apparatus, comprising:
a processor; and
a memory to store computer program instructions for identifying a legal concept associated with a legal document, the computer program instructions when executed on the processor cause the processor to perform operations comprising:
training a machine learning model for predicting an identification of statements and associated citations to cited documents in legal documents using training legal documents annotated to identify statements and associated citations;
identifying a statement and an associated citation to a cited document in a legal document by determining that the statement corresponds with the associated citation to the cited document based on a type of the cited document using the trained machine learning model;
determining a correspondence between a statement in the cited document and the statement identified in the legal document by comparing possible statements identified in the cited document with the statement identified from the legal document; and
identifying a legal concept associated with the legal document as the statement identified in the legal document based on the correspondence.

9. The apparatus as recited in claim 8, wherein determining a correspondence between a statement in the cited document and the statement identified in the legal document further comprises:
determining a machine-readable representation of the citation to the cited document; and
retrieving the cited document based on the machine-readable representation.

10. The apparatus as recited in claim 8, wherein determining a correspondence between a statement in the cited document and the statement identified in the legal document further comprises:
filtering the possible statements prior to the comparing.

11. A non-transitory computer readable medium storing computer program instructions for identifying a legal concept associated with a legal document, which, when executed on a processor, cause the processor to perform operations comprising:
training a machine learning model for predicting an identification of statements and associated citations to cited documents in legal documents using training legal documents annotated to identify statements and associated citations;
identifying a statement and an associated citation to a cited document in a legal document by determining that the statement corresponds with the associated citation to the cited document based on a type of the cited document using the trained machine learning model;
determining a correspondence between a statement in the cited document and the statement identified in the legal document by comparing possible statements identified in the cited document with the statement identified from the legal document; and
identifying a legal concept associated with the legal document as the statement identified in the legal document based on the correspondence.

12. The non-transitory computer readable medium as recited in claim 11, wherein identifying a statement and an associated citation to a cited document in a legal document comprises:
identifying the statement and the associated citation to the cited document in the legal document based on candidate citations identified in the legal document, candidate statements identified in the legal document, and sentence boundaries identified in the legal document.

13. The non-transitory computer readable medium as recited in claim 12, wherein identifying the statement and the associated citation to the cited document in the legal document based on candidate citations identified in the legal document, candidate statements identified in the legal document, and sentence boundaries identified in the legal document comprises:
parsing the legal document based on the candidate citations identified in the legal document, the candidate statements identified in the legal document, and the sentence boundaries identified in the legal document; and
applying the trained machine learning model to identify the statement and the associated citation to the cited document in the legal document based on the parsed legal document.

14. The non-transitory computer readable medium as recited in claim 11, the operations further comprising:
identifying other legal documents associated with the legal concept; and
generating a map showing a relationship between the legal document and the other legal documents.

15. The non-transitory computer readable medium as recited in claim 14, wherein generating a map showing a relationship between the legal document and the other legal documents comprises:
generating a directed graph having nodes representing the legal document and the other legal documents, and edges connecting the nodes, the edges directed from a node representing a citing document to a node representing a cited document.

* * * * *